E. BARRACLOUGH & T. PRITCHARD.
Fifth-Wheel.

No. 160,253.  Patented March 2, 1875.

Witnesses:
William Moor
George Anderson

Inventors:
Edward Barraclough
Timothy Pritchard

UNITED STATES PATENT OFFICE.

EDWARD BARRACLOUGH AND TIMOTHY PRITCHARD, OF BROOKLYN, N. Y.

IMPROVEMENT IN FIFTH-WHEELS.

Specification forming part of Letters Patent No. 160,253, dated March 2, 1875; application filed September 30, 1874.

*To all whom it may concern:*

Be it known that we, EDWARD BARRACLOUGH and TIMOTHY PRITCHARD, of Brooklyn, county of Kings, State of New York, have invented certain new and useful Improvements in Fifth-Wheels for Wagons, of which the following is a specification:

This invention relates to fifth-wheels for wagons and other vehicles, and is made of two working parts and placed between the front axle and body of the vehicle. Fifth-wheels have heretofore been made by placing two flat surfaces together, which is objectionable on account of the sand and dirt working in between the surfaces, increasing instead of relieving the strain on the king-bolt, and also in the event of the breaking of the king-bolt it does not prevent the vehicle from coming apart, as is obviously the case with our improvement; but the draft or strain comes entirely on the fifth-wheel, and would prevent the possibility of the breaking of the king-bolt.

The fifth-wheel is composed of two flange-rings fitting into each other, and a cap-plate or washer, about the diameter of the outer ring, to cover the joint between said outer and inner rings, to keep the dirt from said joint. The rings are made of flange or angle iron. The iron is bent round with the flange on the inside to the required size for the outer ring, thus making a ring the interior opening of which is of two different diameters. The smaller or inner ring is bent round with its flange on the outside, and is made to fit the unequal diameters of said outer ring, and making the upper and lower surfaces flush with each other. The cap-plate or washer is of iron of a suitable thickness and of a diameter to suit the upper surfaces of the two rings, and is attached to and moves with the inner ring.

Figure 1:
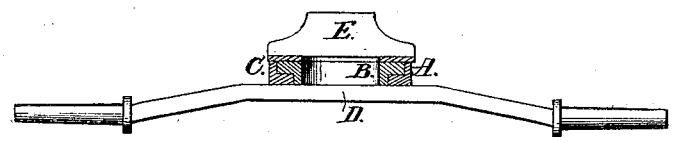
Figure 2:
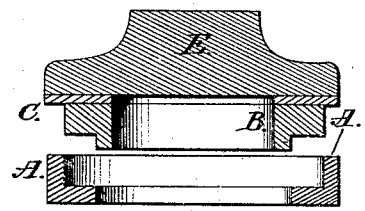
Figure 3:
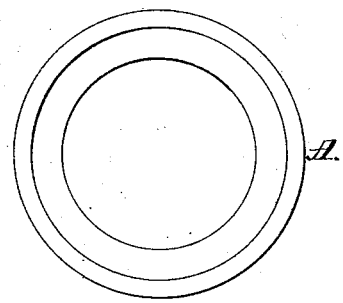
Figure 4:
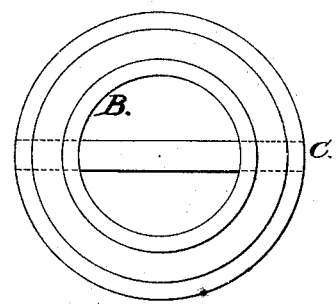

In the accompanying drawing, Figure 1 is a sectional view of the fifth-wheel in line with the axle, and shown in place between the axle and rocker. Fig. 2 is a sectional view of the same, with the parts separated and cap or washer in position. Fig. 3 is a top view of the outer ring of the fifth-wheel. Fig. 4 is a bottom view of inside ring and cap or washer attached.

Letter A represents the outer ring of the fifth-wheel; B, the inner ring; C, the cap or washer; D, the axle; and E, the rocker.

Having described our invention we claim—

1. The outer flanged ring A in combination with the inner flanged ring B, as and for the purpose set forth.

2. The outer flanged ring A with inner flanged ring B and cap C in combination, as and for the purpose set forth.

In testimony whereof we have hereunto set our hands this 15th day of September, 1874.

EDWARD BARRACLOUGH.
TIMOTHY PRITCHARD.

Witnesses:
WILLIAM MOORE,
GEORGE ANDERSON.